Patented Apr. 15, 1941

2,238,868

UNITED STATES PATENT OFFICE 2,238,868

PURIFYING GONADOTROPIC HORMONAL SUBSTANCE

George F. Cartland, Kalamazoo, Mich., assignor to The Upjohn Company, Kalamazoo, Mich.

No Drawing. Application April 8, 1937, Serial No. 135,769

11 Claims. (Cl. 167—74)

This invention relates to improvements in purifying gonadotropic hormonal substance.

This invention relates to the gonad-stimulating hormone which occurs in the blood of pregnant mares during early pregnancy and in particular to the method of isolating the hormone from the blood or the plasma of such blood to obtain a highly purified product free from protein impurities or other harmful nitrogenous substances and which may be used in human therapy for injections without ill effects on the patient. In following out the invention, it is possible to produce from plasma from pregnant mares' blood containing the hormone, a hormone fraction which is of very high efficacy in the treatment of sexual deficiencies and the fraction produced by the method is of extreme purity and free from toxic or other objectionable impurities and in a higher state of purity than has heretofore been possible. The method makes it possible to obtain this highly purified product at very substantial yields by a process which is suitable for manufacturing on a pharmaceutical scale, and it is possible to produce the product in a state of sufficient purity to permit safety in human therapy.

The objects of this invention are:

First, to provide a new and improved method of producing the aforementioned gonadotropic or gonad-stimulating hormone.

Second, to provide such a method of producing the hormone which is, because of the simple nature of the various steps involved, inexpensive and well adapted to the commercial preparation of the hormone in a form suitable for human therapy.

Third, to produce such a method that eliminates from plasma made from the blood of pregnant mares the objectionable horse serum proteins and other undesirable substances which are present in the plasma or crude extract of the blood containing the hormone, leaving the isolated hormone in a highly biologically active state and highly purified.

Fourth, to produce such a method which eliminates expensive time consuming steps which in the old processes produce substantial losses of the hormone.

Fifth, to produce such a method which employs first the fractional precipitation from the crude plasma at its isoelectric point of the impurities and then the fractional precipitation of the hormone at its isoelectric point from the supernatant liquid of the first step.

Sixth, to provide a new and improved gonad-stimulating hormone fraction which is of high purity and free from objectionable protein and other naturally occurring impurities which accompany it in raw plasma or crude extracts of the hormone obtained from the blood of pregnant mares.

Seventh, to produce such a hormone fraction of high purity which is a stable dry powder that can be used in practical pharmacy and therapeutics, which powder is soluble in water and may be produced in sterile form.

In carrying out the process, the former methods of purifying the hormone have been departed from in that the objectionable and inactive proteins are completely and almost quantitatively removed from a concentrated solution of the hormone and its naturally occurring impurities, which may be referred to as the crude solution, by precipitating these impurities at their isoelectric point, leaving the hormone in solution. The next step is to precipitate the hormone almost quantitatively from the supernatant liquid resulting from the earlier treatment which results in a recovery of the hormone in a highly pure state which is particularly suited for therapeutic use. By following this method it is possible to make extracts directly from the crude plasma and a separation of the proteins and of the citrates in the plasma is almost completely brought about, the amounts remaining being so slight as to be unnoticeable.

In carrying out the process, I produce a concentrated solution of the hormone and the naturally occurring impurities in acetone or alcohol. The blood plasma which has been citrated, as is standard practice, is made substantially alkaline by adjusting the pH to from 7 to 7.5. If acetone is used, I add an equal amount of acetone which produces a concentrated solution of the hormone and its naturally occurring impurities in 50% acetone. At this pH and concentration, a large portion of the protein impurities and other impurities are precipitated and practically none of the hormone is carried down. I prefer to separate the supernatant liquid from the precipitate and to then adjust the pH of the supernatant to substantially 6 to make it acid. This results in further precipitation of impurities which have this isoelectric point in this concentration of the acetone. After the precipitation of the impurities has taken place, I separate the supernatant liquid from the precipitate and add acetone thereto in sufficient quantities to make the supernatant 70% acetone. This results in a precipitation of the hormone and the hormone thus precipitated is of a very high state of purity.

If ethyl alcohol is to be employed instead of acetone, I add to the blood plasma enough alcohol to make the mixture 60% alcohol, the blood plasma having been at a pH of 7 to 7.5. This results in the precipitation of a great many of the naturally occurring impurities. The pH is then adjusted to 6 to make the liquid acid and further impurities are precipitated. I prefer to separate the supernatant from the first precipitation before carrying on the second precipitation. After the second precipitation, I separate the supernatant from the precipitated impurities and add sufficient alcohol to make the supernatant 70% ethyl alcohol. This results in a precipitation of the hormone and I separate the precipitate which is the biologically active fraction in highly purified state.

In carrying out the process, it is of importance to keep the solution of hormone and its impurities concentrated as above indicated in order to assure more complete precipitation of impurities and the hormones than could be obtained from dilute solutions. In carrying out the process, the separation of supernatant and precipitates may be made with centrifuges or filters or in whatever manner is desired, and the formation of the precipitate and the precipitation of any one of the steps will ordinarily take in the neighborhood of 16 hours during which time the material is kept in a cold room. It is important in commercial processes to employ the small volumes of concentrate in the solutions indicated above since this, in addition to eliminating impurities more than in dilute solutions, makes a more satisfactory commercial process.

The precipitate from either of the above processes is a dry white water soluble powder which is quite free from nitrogenous impurities and is very high in biological activity. It represents about a 1 to 30 concentration on the basis of total solids and a 1 to 300 concentration on the basis of total nitrogen. Since the total nitrogen is a measure of the maximum present protein content of the material, it will be apparent that the nitrogen content is of the utmost importance. In the product at this stage the active precipitate contains less than .33% of the protein which was present in the original plasma. In other words, more than 99% of the objectionable horse serum proteins are removed in obtaining the stable white powder which gives substantially quantitative yields of the biologically active hormone.

The biologically active hormone powder obtained above may be further purified. The precipitate is redissolved in 10% acetone solution using substantially 23 cc. of the acetone solution for each gram of the precipitate. Certain of the impurities are not dissolved in the acetone solution and the solution is separated from the undissolved portions which are discarded. The 10% acetone solution thus obtained is adjusted to pH 6 and sufficient acetone is added to make 50% acetone solution by volume. After standing over night in the refrigerator, a precipitate forms and is removed. To this 50% acetone supernatant liquid is added 50% acetone to produce a volume of about 75 cc. for each gram of solid material in the supernatant liquid and the hormone is precipitated from this diluted solution by adding sufficient acetone to make the solution 65% acetone. The precipitate is collected and washed with alcohol and ether and then dried. The supernatant liquid is discarded. This precipitate from the 65% acetone solution is a dry, white, water soluble powder and in following out the method this represents about 89% of the total gonad-stimulating hormones present in the original plasma. It represents a 1 to 130 concentration on the basis of total solids and a 1 to 560 concentration on the basis of total nitrogen, leaving a total protein content less than .18% of the protein which was present in the original plasma. This represents about 99.8% removal of the objectionable horse serum proteins and gives a substantially quantitative yield of the biologically active hormone. This hormone fraction is substantially free from the objectionable horse serum protein and is suitable for use in clinical human therapy. Since the product is sterilized by acetone, alcohol and ether treatment in washing and drying, it can be collected and dried in a sterile container and may then be made up for use as desired.

In pointing out the nitrogen content, I have not attempted to indicate whether or not it was strictly protein material or whether it was nitrogen, but in tests conducted it is demonstrated that a portion of the nitrogen content is not due to the presence of nitrogen in protein and that a very small part of the total nitrogen represents actual protein nitrogen. From the standpoint of practical therapeutics this is of extreme importance and the tests of my product show its value in eliminating the danger of horse serum shock with which every allergist is familiar.

The safety of my product for clinical human use has been proved by intravenous injections in human patients under carefully controlled conditions.

The following is a detailed description of my process: 16.5 liters of citrated blood plasma containing the hormone is employed. The pH is adjusted to 7.4 and 16.5 liters of acetone are added. This mixture is allowed to stand for 16 hours and a precipitate which forms is separated from the supernatant liquid and the precipitate is discarded. If desired, the precipitate may be washed with 16.5 liters of 50% acetone which may be added to the already obtained supernatant liquid. To the 50% acetone supernatant, either with or without the above mentioned washings, I add hydrochloric acid or acetic acid to adjust the pH to 6. The supernatant is then allowed to stand 16 hours in a cold room and is supercentrifuged to remove the precipitate which has formed. This precipitate is discarded and acetone is added to the supernatant to make it 70% acetone. The supernatant liquid is then allowed to chill 16 hours and is centrifuged. The precipitate thus formed contains the active hormone fraction. The precipitate is washed with alcohol and ether and dried.

In the example of the process here referred to this will result in about 44.2 g. of precipitate. The total nitrogen content is 550 mg. and the material has substantially all of the hormone from the starting plasma. This material is redissolved in 1000 cc. of 10% acetone solution. The insoluble material is separated by a centrifuge and discarded. The 10% acetone solution has added to it sufficient acetone to make to 50% acetone and the pH is adjusted to 6. This is permitted to chill 16 hours and is then centrifuged to separate the precipitate which is discarded. The 50% acetone supernatant liquid at pH 6 is diluted to 2700 cc. with 50% acetone and acetone is added to make the total acetone content 65%. This is chilled for about 16 hours and centrifuged to separate the precipitate which is saved. This precipitate is washed with alcohol and ether and is dried. It contains the active hormone.

In the specific example given, the precipitate would weigh about 9.81 g. with a total nitrogen content of 261 mg. and an assay will show substantially all of the hormone of the starting material. It will be appreciated that the yields vary somewhat with the crude plasma and its original hormone content which varies somewhat throughout the early pregnancy of the mare. The starting material to which I have referred is a typical sample of the serum taken from the blood of a pregnant mare and it will be understood that it is merely cited as an illustration of my invention.

The product obtained in following the steps of this invention is a white, water soluble powder containing the hormone. It is quite stable insofar as biological activity is concerned at room temperatures which are approximately 70 to 80 degrees Fahr. Assays made of the product show that in doses of as low as .009 mg. it will produce stimulation of the gonads in rats. This amount of solid to produce the stimulation may be administered either in a single dose or a series of doses. .009 mg. of this substance on analysis will show a total nitrogen content of .00025 mg., which includes all nitrogen, either present in the hormone or in whatever impurities might still be present in the product.

Having thus described my invention, what I claim as new and desire to secure by Letters Patent is:

1. In the process of purifying the gonadotropic hormone occurring in the blood of pregnant equine animals during early pregnancy, the steps of producing a substantially alkaline solution of the hormone and its naturally occurring impurities in water and a solvent selected from the group consisting of acetone and alcohol, controlling the concentration of said solvent to make the mixture capable of holding the hormone in solution and incapable of holding a portion of the impurities in solution, adjusting the pH of the mixture to make it acid and capable of retaining the hormone in solution and substantially incapable of retaining the balance of the impurities in solution, separating the supernatant liquid, increasing the concentration of the solvent in the supernatant liquid to a point at which the supernatant liquid is incapable of holding the hormone in solution, and separating the precipitated hormone.

2. In the process of purifying the gonadotropic hormone occurring in the blood of pregnant equine animals during early pregnancy, the steps of producing a solution of the hormone and its naturally occurring impurities in water and a solvent selected from the group consisting of acetone and alcohol, controlling the concentration of the solvent and the pH of the solution to precipitate the impurities and not the hormone, separating the supernatant liquid, and controlling the concentration of the solvent in the supernatant liquid and the pH thereof to precipitate the hormone.

3. In the process of purifying the gonadotropic hormone occurring in the blood of pregnant equine animals during early pregnancy, the steps of producing a solution of the hormone and its naturally occurring impurities in water and a solvent selected from the group consisting of acetone and alcohol, precipitating the impurities and not the hormone by controlling the concentration of said solvent and the pH of the solution to produce an isoelectric point of the impurities which is not an isoelectric point of the hormone, separating the supernatant liquid from precipitated impurities, controlling the concentration of the solvent in the supernatant liquid and the pH thereof to produce an isoelectric point for the hormone to precipitate the same, and separating the precipitated hormone.

4. In the method of purifying the gonadotropic hormone occurring in the blood of animals of the equine group during early pregnancy, the steps comprising adjusting the pH of blood plasma containing the hormone to from 7 to 7.5, adding a volume of ethyl alcohol to make a 60% alcohol solution and permitting precipitation of impurities, separating the supernatant liquid and adjusting the pH thereof to substantially 6, permitting the precipitation of the impurities, separating the supernatant liquid at pH 6 therefrom, adding ethyl alcohol to make the supernatant liquid 70% alcohol, permitting a precipitate to form, and separating and retaining the precipitate thus produced.

5. In the method of purifying the gonadotropic hormone occurring in the blood of animals of the equine group during early pregnancy, the steps comprising adjusting the pH of blood plasma containing the hormone to make it substantially alkaline, adding a volume of ethyl alcohol to make a 60% alcohol solution and permitting precipitation of impurities, separating the supernatant liquid and adjusting the pH thereof to substantially acid, permitting the precipitation of the impurities, separating the supernatant liquid therefrom, adding ethyl alcohol to make the supernatant liquid 70% alcohol, permitting a precipitate to form, and separating and retaining the precipitate thus produced.

6. In the process of purifying the gonadotropic hormone occurring in the blood of pregnant equine animals during early pregnancy, the steps of producing a solution of the hormone and its naturally occurring impurities in water and alcohol, controlling the concentration of the solvent and the pH of the solution to precipitate the impurities and not the hormone, separating the supernatant liquid, and controlling the concentration of the solvent in the supernatant liquid and the pH thereof to precipitate the hormone.

7. The method of purifying the gonadotropic hormone occurring in the blood of animals of the equine group during early pregnancy, comprising adjusting the pH of blood plasma containing the hormone from 7 to 7.5, adding an equal volume of acetone and permitting precipitation of impurities, separating the supernatant liquid and adjusting the pH thereof to substantially 6, permitting the further precipitation of the impurities, separating the supernatant liquid at pH 6 therefrom, adding acetone to make said supernatant liquid 70% acetone, permitting a precipitate to form, separating said precipitate thus produced in 70% acetone at pH 6, and redissolving said precipitate in 10% acetone solution using substantially 23 cc. of acetone solution for each gram of said precipitate, separating said 10% solution from insoluble portions of said precipitate, adding acetone to make said 10% solution a 50% acetone solution and adjusting the pH thereof to substantially 6, permitting a precipitate to form, separating the 50% acetone supernatant liquid and diluting said supernatant with 50% acetone to produce a volume of about 75 cc. for each gram of solid material, adding acetone to make the solution 65% acetone, permitting the hormones to precipitate, and separating the precipitated hormone.

8. The method of purifying the gonadotropic hormone occurring in the blood of animals of the equine group during early pregnancy, comprising adjusting the pH of blood plasma containing the hormone to make it substantially alkaline, adding an equal volume of acetone and permitting precipitation of impurities, separating the supernatant liquid and adjusting the pH thereof to make it acid, permitting the further precipitation of the impurities, separating the supernatant liquid therefrom, adding acetone to make said supernatant liquid 70% acetone, permitting a precipitate to form, separating said precipitate thus produced, and re-dissolving said precipitate in 10% acetone solution using substantially 23 cc. of acetone solution for each gram of said precipitate, separating said 10% solution from insoluble portions of said precipitate, adding acetone to make said 10% solution a 50% acetone solution, and adjusting the pH thereof to make it acid, permitting a precipitate to form, separating the 50% acetone supernatant liquid, and diluting said supernatant with 50% acetone to produce a volume of about 75 cc. for each gram of solid material, adding acetone to make the solution 65% acetone, permitting the hormones to precipitate, and separating the precipitated hormone.

9. The method of purifying the gonadotropic hormone occurring in the blood of animals of the equine group during early pregnancy, comprising adjusting the pH of blood plasma containing the hormone to from 7 to 7.5, adding an equal volume of acetone and permitting precipitation of impurities, separating the supernatant liquid and adjusting the pH thereof to substantially 6, permitting the further precipitation of the impurities, separating the supernatant liquid at pH 6 therefrom, adding acetone to make said supernatant liquid 70% acetone, permitting a precipitate to form, separating said precipitate thus produced in 70% acetone at pH 6, and re-dissolving said precipitate in 10% acetone solution, separating said 10% solution from insoluble portions of said precipitate, adding acetone to make said 10% solution a 50% acetone solution and adjusting the pH thereof to substantially 6, permitting a precipitate to form, separating the 50% acetone supernatant liquid, and diluting said supernatant with 50% acetone, adding acetone to make the solution 65% acetone, permitting the hormones to precipitate, and separating the precipitated hormone.

10. The method of purifying the gonadotropic hormone occurring in the blood of animals of the equine group during early pregnancy, comprising adjusting the pH of blood plasma containing the hormone to make it substantially alkaline, adding an equal volume of acetone and permitting precipitation of impurities, separating the supernatant liquid and adjusting the pH thereof to make it acid, permitting the further precipitation of the impurities, separating the supernatant liquid therefrom, adding acetone to make said supernatant liquid 70% acetone, permitting a precipitate to form, separating said precipitate thus produced, and re-dissolving said precipitate in 10% acetone solution, separating said 10% solution from insoluble portions of said precipitate, adding acetone to make said 10% solution a 50% acetone solution, and adjusting the pH thereof to make it acid, permitting a precipitate to form, separating the 50% acetone supernatant liquid and diluting said supernatant with 50% acetone, adding acetone to make the solution 65% acetone, permitting the hormones to precipitate, and separating the precipitated hormone.

11. In the method of purifying the gonadotropic hormone occurring in the blood of animals of the equine group during early pregnancy, the steps comprising adjusting the pH of blood plasma containing the hormone to make it substantially alkaline, adding an equal volume of acetone and permitting precipitation of impurities, separating the supernatant liquid and adjusting the pH thereof to make it acid, permitting the further precipitation of the impurities, separating the supernatant liquid therefrom, adding acetone to make said supernatant liquid 70% acetone, permitting a precipitate to form, and separating said precipitate thus produced.

GEORGE F. CARTLAND.